(12) United States Patent
Chikami et al.

(10) Patent No.: US 8,978,744 B2
(45) Date of Patent: Mar. 17, 2015

(54) HOT-WATER STORAGE TYPE HOT-WATER SUPPLY DEVICE AND HOT-WATER STORAGE TYPE HEATING AND HOT-WATER SUPPLY DEVICE

(75) Inventors: Hideo Chikami, Kusatsu (JP); Yuuichi Kita, Kusatsu (JP); Kyouji Araya, Kusatsu (JP); Takashi Tsuchino, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 761 days.

(21) Appl. No.: 12/865,583

(22) PCT Filed: Jan. 30, 2009

(86) PCT No.: PCT/JP2009/051552
§ 371 (c)(1),
(2), (4) Date: Jul. 30, 2010

(87) PCT Pub. No.: WO2009/096512
PCT Pub. Date: Aug. 6, 2009

(65) Prior Publication Data
US 2010/0319378 A1 Dec. 23, 2010

(30) Foreign Application Priority Data

| Feb. 1, 2008 | (JP) | 2008-023071 |
| Apr. 16, 2008 | (JP) | 2008-106838 |
| Jan. 23, 2009 | (JP) | 2009-013142 |

(51) Int. Cl.
*F28D 7/02* (2006.01)
*F28F 13/00* (2006.01)
(Continued)

(52) U.S. Cl.
CPC ............ *F24D 11/0214* (2013.01); *F24D 3/082* (2013.01); *F24D 12/02* (2013.01); *F24D 19/1021* (2013.01); *F24D 19/1072* (2013.01); *F24D 2200/06* (2013.01); *F24D 2200/08* (2013.01); *F24D 2200/12* (2013.01); *F24D 2220/042* (2013.01); *F24D 2220/2009* (2013.01); *F24D 2220/209* (2013.01); *F28D 7/024* (2013.01); *F28D 20/0039* (2013.01); *F28D 2020/0078* (2013.01);
(Continued)

(58) Field of Classification Search
USPC ............ 62/238.7, 238.1, 324.1; 236/12.1, 13; 165/146, 163
See application file for complete search history.

(56) References Cited

U.S. PATENT DOCUMENTS

| 3,545,228 A | * | 12/1970 | Dinger et al. | 62/506 |
| 3,977,601 A | * | 8/1976 | Bearzi | 126/586 |
| 4,296,738 A | * | 10/1981 | Kelton | 126/656 |
| 4,693,089 A | * | 9/1987 | Bourne et al. | 62/79 |

(Continued)

FOREIGN PATENT DOCUMENTS

| JP | 2001153458 A | * | 6/2001 |
| JP | 2001-221501 A | | 8/2001 |

(Continued)

*Primary Examiner* — Mohammad M Ali
*Assistant Examiner* — Zachary R Anderegg
(74) *Attorney, Agent, or Firm* — Birch, Stewart, Kolasch & Birch, LLP

(57) ABSTRACT

A hot-water storage type hot-water supply device includes a heat pump unit (1) for heating water, a hot-water storage tank (21) for storing hot water heated by the heat pump unit (1), and a hot-water supplying heat exchanger (22) placed so as to extend roughly entirely in a vertical direction thereof and which receives water from a lower side thereof and discharges hot water from an upper side thereof.

11 Claims, 10 Drawing Sheets

(51) Int. Cl.
*F25B 27/00* (2006.01)
*F24D 11/02* (2006.01)
*F24D 3/08* (2006.01)
*F24D 12/02* (2006.01)
*F24D 19/10* (2006.01)
*F28D 20/00* (2006.01)
*F28F 1/20* (2006.01)
*F28F 1/36* (2006.01)
*F28F 1/40* (2006.01)

(52) U.S. Cl.
CPC .. *F28F 1/20* (2013.01); *F28F 1/36* (2013.01); *F28F 1/40* (2013.01); *Y02B 30/126* (2013.01); *Y02B 30/14* (2013.01); *Y02E 60/142* (2013.01); *F24D 2240/26* (2013.01)
USPC .......... 165/163; 165/146; 62/238.1; 62/238.7

(56) References Cited

U.S. PATENT DOCUMENTS

| | | | | |
|---|---|---|---|---|
| 5,465,588 | A | * | 11/1995 | McCahill et al. ............... 62/127 |
| 5,485,879 | A | * | 1/1996 | Lannes ....................... 122/18.31 |
| 2005/0022542 | A1 | * | 2/2005 | Sakakibara ...................... 62/183 |
| 2005/0145370 | A1 | * | 7/2005 | Merryfull ................. 165/104.19 |
| 2005/0150969 | A1 | * | 7/2005 | Nakayama et al. ............. 237/12 |

FOREIGN PATENT DOCUMENTS

| | | | |
|---|---|---|---|
| JP | 2002-318006 | A | 10/2002 |
| JP | 2003-185271 | A | 7/2003 |
| JP | 2003-247753 | A | 9/2003 |
| JP | 2005-172336 | A | 6/2005 |
| JP | 2005-326078 | A | 11/2005 |
| JP | 2006-84090 | A | 3/2006 |
| JP | 2006-329581 | A | 12/2006 |
| JP | 2008267792 | A * | 11/2008 |

* cited by examiner

HOT-WATER STORAGE TYPE HOT-WATER SUPPLY DEVICE AND HOT-WATER STORAGE TYPE HEATING AND HOT-WATER SUPPLY DEVICE

TECHNICAL FIELD

The present invention relates to a hot-water storage type hot-water supply device and a hot-water storage type heating and hot-water supply device.

BACKGROUND ART

Conventionally, there has been provided a hot-water storage type heating and hot-water supply device which includes a heat pump unit for heating water, and a hot-water storage tank for storing hot water heated by the heat pump unit, so that heating or hot water supply is fulfilled by utilizing hot water contained in the hot-water storage tank (see, e.g., JP 2006-329581 A).

In this hot-water storage type heating and hot-water supply device, hot water stored in the hot-water storage tank is outputted as it is. By contrast, in some other cases, a hot-water supplying heat exchanger is placed in the hot-water storage tank in terms of sanitation or the like, and hot water is outputted from a water supply port via the hot-water supplying heat exchanger. In a hot-water storage type heating and hot-water supply device with use of such a hot-water supplying heat exchanger, there is a problem that it is quite difficult to realize a hot-water supplying heat exchanger capable of performing efficient heat exchange between the hot water in the hot-water storage tank and the supply hot water.

SUMMARY OF INVENTION

Technical Problem

Accordingly, an object of the present invention is to provide a hot-water storage type hot-water supply device and a hot-water storage type heating and hot-water supply device capable of improving the heat exchange efficiency of the hot-water supplying heat exchanger with a simple construction and supplying high-temperature supply hot water.

Solution to Problem

In order to achieve the above object, the present invention provides a hot-water storage type hot-water supply device comprising:

a heat pump unit for heating water;

a hot-water storage tank for storing hot water heated by the heat pump unit; and a hot-water supplying heat exchanger including a pipe which is placed in the hot-water storage tank so as to extend roughly entirely in a vertical direction thereof and which receives water from a lower side thereof and discharges hot water from an upper side thereof.

According to the hot-water storage type hot-water supply device of this invention, in the hot-water storage tank in which hot water heated by the heat pump unit has been stored and in which the hot-water temperature distribution increases gradually higher and higher from lower toward upper side, low-temperature supply hot water that has flowed in from the lower side of the hot-water supplying heat exchanger including the pipe is heat-exchanged in a hot-water region of relatively low temperatures on the lower side within the hot-water storage tank, and heat-exchanged in upper-side higher-temperature hot-water region within the hot-water storage tank while flowing upward in the hot-water supplying heat exchanger, thus being delivered as high-temperature supply hot water. Thus, since the supply hot water flows from lower to upper side according to the temperature gradient in the hot-water storage tank while being heated by heat exchange, so that the temperature distribution in the hot-water storage tank is never disturbed, allowing high heat exchange efficiency to be obtained. Accordingly, with a simple construction, the heat exchange efficiency of the hot-water supplying heat exchanger can be improved, and high-temperature hot water can be supplied. Further, low-temperature water on the lower side within the hot-water storage tank is heated by the heat pump unit while the vertical temperature gradient in the hot-water storage tank is formed, by which the COP (Coefficient Of Performance) of the heat pump unit can be improved.

In an embodiment, heat exchange power of the hot-water supplying heat exchanger per unit volume of the hot-water storage tank is so set as to be higher in an upper-side portion than in a lower-side portion.

According to this embodiment, in a hot-water region of relatively low temperature on the lower-side portion within the hot-water storage tank, heat exchange power of the hot-water supplying heat exchanger per unit volume of the hot-water storage tank is so set as to be higher in an upper-side portion than in a lower-side portion. As a result, heat exchange is suppressed in comparison to the case in which the heat exchange power is equal between the upper-side portion and the lower-side portion, so that the cooling of the hot-water region on the lower side within the hot-water storage tank is suppressed. Thus, in heating with the hot water in the hot-water storage tank used as the heat source, heating power deficiency can be prevented.

On the other hand, in the higher-temperature hot-water region on the upper side within the hot-water storage tank, as the water flows toward the upper side of the hot-water supplying heat exchanger, the heat exchange power of the hot-water supplying heat exchanger per unit volume of the hot-water storage tank is set larger in the upper-side portion than in the lower-side portion, by which heat exchange is fulfilled enough so that high-temperature supply hot water can be obtained.

In an embodiment, the hot-water supplying heat exchanger includes a coil-like pipe.

According to this embodiment, by using the coil-like pipe for the hot-water supplying heat exchanger, the hot-water supplying heat exchanger can be placed efficiently over the generally entire vertical region of the hot-water storage tank.

In an embodiment, the hot-water supplying heat exchanger has a lower-side coil portion and an upper-side coil portion, and an electrothermal heater placed between the lower-side coil portion and the upper-side coil portion is included.

According to this embodiment, the electrothermal heater is placed between the lower-side coil portion and the upper-side coil portion of the hot-water supplying heat exchanger, it becomes possible that in case of capacity deficiency or failures of the heat pump unit, hot water in the intermediate portion within the hot-water storage tank is heated by using the electrothermal heater, thus allowing the heating power of the electrothermal heater to be used as an auxiliary. Furthermore, in a failure of the heat pump unit, heating the hot water at the intermediate portion in the hot-water storage tank by using the electrothermal heater allows the start-up of hot-water supply to be improved in comparison to the case in which the electrothermal heater is placed on the lower side in the hot-water storage tank so that more time is taken for boil-up.

In an embodiment, the coil-like pipe of the hot-water supplying heat exchanger has a smaller pitch in an upper-side portion than in a lower-side portion.

According to this embodiment, the hot-water region of relatively low temperature on the lower side in the hot-water storage tank is made larger in pitch of the coil-like pipe of the hot-water supplying heat exchanger. As a result, heat exchange is suppressed in comparison to the case in which the coil-like pipe is equal in pitch between the upper-side portion and the lower-side portion, so that the cooling of the hot-water region on the lower side within the hot-water storage tank is suppressed. Thus, in heating with the hot water in the hot-water storage tank used as the heat source, heating power deficiency can be prevented.

On the other hand, in the higher-temperature hot-water region on the upper side within the hot-water storage tank, as the water flows toward the upper side of the hot-water supplying heat exchanger, the coil-like pipe of the hot-water supplying heat exchanger is made smaller in pitch, i.e. densely arranged, by which heat exchange is fulfilled enough so that high-temperature supply hot water can be obtained.

In an embodiment, the coil-like pipe of the hot-water supplying heat exchanger is smaller in inner diameter in a lower-side portion thereof than in an upper-side portion thereof.

According to this embodiment, by making the upper-side portion of the coil-like pipe in the hot-water supplying heat exchanger smaller in inner diameter than in the lower-side portion, the flow velocity in the upper-side portion is increased, thus improving the heat transfer rate. As a result, heat exchange is fulfilled enough in the upper-side high-temperature hot-water region within the hot-water storage tank, so that high-temperature supply hot water can be obtained.

In an embodiment, grooves are provided in an inner surface of an upper-side portion of the coil-like pipe of the hot-water supplying heat exchanger.

According to this embodiment, the heat transfer rate of the upper-side portion of the coil-like pipe is improved by grooves provided in the inner surface of the upper-side portion of the coil-like pipe of the hot-water supplying heat exchanger. Thus, heat exchange is fulfilled enough in the upper-side high-temperature hot-water region within the hot-water storage tank, so that high-temperature supply hot water can be obtained.

In an embodiment, fins are provided in an outer circumferential surface of an upper-side portion out of the coil-like pipe of the hot-water supplying heat exchanger.

According to this embodiment, the heat transfer rate of the upper-side portion of the coil-like pipe is improved by the fins provided on the outer circumferential surface of the upper-side portion of the coil-like pipe of the hot-water supplying heat exchanger. Thus, heat exchange is fulfilled enough in the upper-side high-temperature hot-water region within the hot-water storage tank, so that high-temperature supply hot water can be obtained.

In an embodiment, the heat pump unit uses carbon dioxide as a refrigerant.

According to this embodiment, using carbon dioxide as the refrigerant for the heat pump unit makes it possible to give contribution to global warming countermeasures since carbon dioxide is smaller in global warming potential so as not to deplete ozone. Further, since carbon dioxide is higher in condensing temperature as compared with HFC refrigerant or the like, it becomes possible to raise the hot-water temperature produced by the heat pump unit (e.g., 90° C.).

Also in this invention, there is provided a hot-water storage type heating and hot-water supply device, comprising:

one of the hot-water storage type hot-water supply devices as described above;

heating terminals connected between a heating-forward port and a heating-return port of the hot-water storage tank of the hot-water storage type hot-water supply device, and a circulating pump for circulating hot water within the hot-water storage tank via the heating terminals, wherein an upper-side region in the hot-water storage tank is used primarily as a heat source for hot-water supply, and a lower-side region in the hot-water storage tank is used primarily as a heat source for heating.

In this case, with a simple construction, the heat exchange efficiency of the hot-water supplying heat exchanger in the hot-water storage type hot-water supply device can be improved, and high-temperature hot water can be supplied. Further, under the condition that the upper-side region in the hot-water storage tank is used primarily as a heat source for hot-water supply while the lower-side region is used primarily as a heat source for heating, the heat source of the upper-side region within the hot-water storage tank can be effectively utilized to supply high-temperature hot water while the heat source of the lower-side region within the hot-water storage tank can be effectively utilized for heating without affecting the high-temperature hot-water supply.

In an embodiment, hot water is discharged from an intermediate region in the hot-water storage tank to the heating terminals by the circulating pump.

According to this embodiment, hot water is delivered from the intermediate region within the hot-water storage tank to heating terminals by the circulating pump. Thus, hot water in the upper-side region within the hot-water storage tank can be maintained in a high-temperature state for use of hot-water supply, so that deterioration of the hot-water supply power due to heating can be prevented.

Advantageous Effects of Invention

As apparent from the above description, according to the hot-water storage type hot-water supply device of the invention, there can be realized a hot-water storage type hot-water supply device which allows the heat exchange efficiency of the hot-water supplying heat exchanger to be improved with a simple construction, and which can supply high-temperature hot water.

Also, according to the hot-water storage type hot-water supply device in an embodiment, the heat exchange power of the hot-water supplying heat exchanger per unit volume of the hot-water storage tank is so set as to be higher in the upper-side portion than in the lower-side portion. As a result, in the hot-water region of relatively low temperature in the lower-side portion within the hot-water storage tank, heat exchange is suppressed in comparison to the case in which the heat exchange power is equal between the upper-side portion and the lower-side portion, so that the cooling of the hot-water region on the lower side within the hot-water storage tank is suppressed. Thus, in heating with the hot water in the hot-water storage tank used as the heat source, heating power deficiency can be prevented. As the water flows toward the upper side of the hot-water supplying heat exchanger, heat exchanger is fulfilled enough in the upper-side high-temperature hot-water region within the hot-water storage tank, so that high-temperature supply hot water can be obtained.

Also, according to the hot-water storage type hot-water supply device in an embodiment, by using a coil-like pipe for the hot-water supplying heat exchanger, the hot-water supplying heat exchanger can be placed efficiently over the generally entire vertical region of the hot-water storage tank.

Also, according to the hot-water storage type hot-water supply device in an embodiment, the electrothermal heater is placed between the lower-side coil portion and the upper-side coil portion of the hot-water supplying heat exchanger, it becomes possible that in case of capacity deficiency or failures of the heat pump unit, hot water in the intermediate portion within the hot-water storage tank is heated by using the electrothermal heater, thus allowing the heating power of the electrothermal heater to be used as an auxiliary. Furthermore, in a failure of the heat pump unit, heating the hot water at the intermediate portion in the hot-water storage tank by using the electrothermal heater allows the start-up of hot-water supply to be improved in comparison to the case in which the electrothermal heater is placed on the lower side in the hot-water storage tank so that more time is taken for boil-up.

Also, according to the hot-water storage type hot-water supply device in an embodiment, the hot-water region of relatively low temperature on the lower side in the hot-water storage tank is made larger in pitch of the coil-like pipe of the hot-water supplying heat exchanger. As a result, heat exchange is suppressed in comparison to the case in which the coil-like pipe is equal in pitch between the upper-side portion and the lower-side portion, so that the cooling of the hot-water region on the lower side within the hot-water storage tank is suppressed. Thus, in heating with the hot water in the hot-water storage tank used as the heat source, heating power deficiency can be prevented. On the other hand, in the higher-temperature hot-water region on the upper side within the hot-water storage tank, as the water flows toward the upper side of the hot-water supplying heat exchanger, the coil-like pipe of the hot-water supplying heat exchanger is made smaller in pitch, i.e. densely arranged, by which heat exchange is fulfilled enough so that high-temperature supply hot water can be obtained.

Also, according to the hot-water storage type hot-water supply device in an embodiment, by making the upper-side portion of the coil-like pipe in the hot-water supplying heat exchanger smaller in inner diameter than in the lower-side portion, the flow velocity in the upper-side portion is increased, thus improving the heat transfer rate. As a result, heat exchange is fulfilled enough in the upper-side high-temperature hot-water region within the hot-water storage tank, so that high-temperature supply hot water can be obtained.

Also, according to the hot-water storage type hot-water supply device in an embodiment, the heat transfer rate of the upper-side portion of the coil-like pipe is improved by grooves provided in the inner surface of the upper-side portion of the coil-like pipe of the hot-water supplying heat exchanger. Thus, heat exchange is fulfilled enough in the upper-side high-temperature hot-water region within the hot-water storage tank, so that high-temperature supply hot water can be obtained.

Also, according to the hot-water storage type hot-water supply device in an embodiment, the heat transfer rate of the upper-side portion of the coil-like pipe is improved by the fins provided on the outer circumferential surface of the upper-side portion of the coil-like pipe of the hot-water supplying heat exchanger. Thus, heat exchange is fulfilled enough in the upper-side high-temperature hot-water region within the hot-water storage tank, so that high-temperature supply hot water can be obtained.

Also, according to the hot-water storage type hot-water supply device in an embodiment, using carbon dioxide as refrigerant for the heat pump unit makes it possible to give contribution to global warming countermeasures. Further, since carbon dioxide is higher in condensing temperature as compared with HFC refrigerant or the like, it becomes possible to raise the hot-water temperature produced by the heat pump unit.

According to the hot-water storage type hot-water supply device of the invention, with a simple construction, the heat exchange efficiency of the hot-water supplying heat exchanger can be improved, and high-temperature hot water can be supplied. Further, under the condition that the upper-side region in the hot-water storage tank is used primarily as a heat source for hot-water supply while the lower-side region is used primarily as a heat source for heating, the heat source of the upper-side region within the hot-water storage tank can be effectively utilized to supply high-temperature hot water while the heat source of the lower-side region within the hot-water storage tank can be effectively utilized for heating without affecting the high-temperature hot-water supply.

Also, according to the hot-water storage type hot-water supply device in an embodiment, hot water is delivered from the intermediate region within the hot-water storage tank to heating terminals by the circulating pump. Thus, hot water in the upper-side region within the hot-water storage tank can be maintained in a high-temperature state for use of hot-water supply, so that deterioration of the hot-water supply power due to heating can be prevented.

DESCRIPTION OF EMBODIMENTS

Hereinbelow, the hot-water storage type hot-water supply device and the hot-water storage type heating and hot-water supply device of the present invention will be described in detail by embodiments thereof illustrated in the accompanying drawings.

First Embodiment

Figure 1:
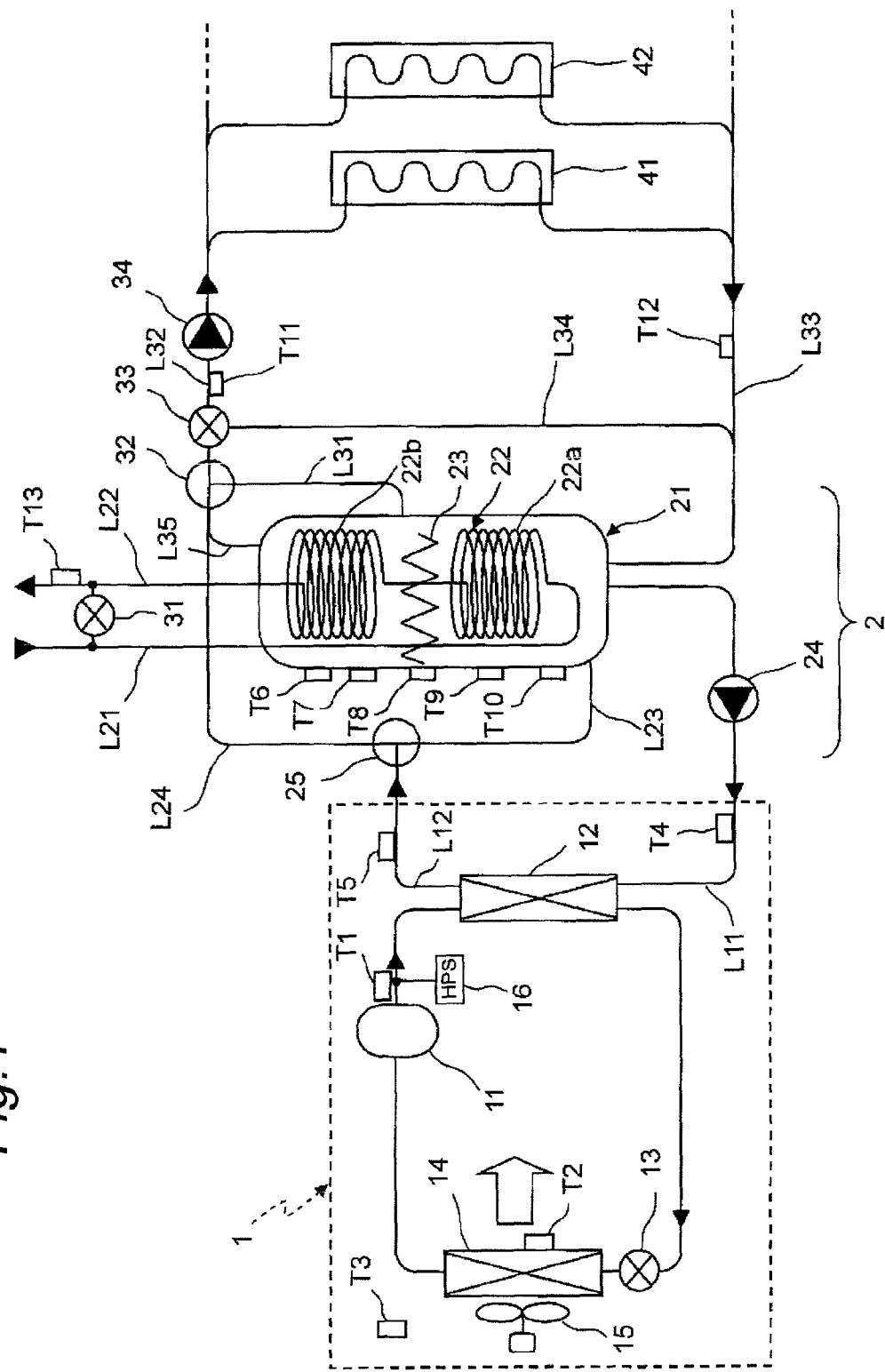
FIG. 1 is a circuit diagram showing a construction of a hot-water storage type heating and hot-water supply device with use of a hot-water storage type hot-water supply device according to a first embodiment of the present invention.

FIG. 1 is a circuit diagram showing a construction of a hot-water storage type heating and hot-water supply device with use of a hot-water storage type hot-water supply device according to a first embodiment of the invention.

This hot-water storage type heating and hot-water supply device, as shown in FIG. 1, includes a heat pump unit 1, a hot-water storage section 2, and a heating and water-heating section for supplying hot water to an unshown heater and a water heater. For the heat pump unit 1, a refrigerant of $CO_2$, which is small in global warming potential (GWP) so as not to destroy ozone, is used. This allows the heat pump unit 1 to produce output hot water of higher temperatures (e.g., 90° C.).

The heat pump unit 1 has a compressor 11, a condenser (water-refrigerant heat exchanger) 12 having one end (primary side) connected to a discharge side of the compressor 11, an expansion valve 13 having one end connected to the other end (primary side) of the condenser 12, an evaporator 14 one end of which is connected to the other end of the expansion valve 13 and the other end of which is connected to a suction side of the compressor 11, and a blower fan 15 for supplying outside air to the evaporator 14. The compressor 11, the condenser 12, the expansion valve 13 and the evaporator 14 constitute a refrigerant circuit.

Also, on the discharge side of the compressor 11, a discharge-temperature sensor T1 for detecting a discharge temperature is placed and moreover a pressure sensor (HPS) 16 for detecting a discharge pressure is placed. Further, an evaporator temperature sensor T2 for detecting an evaporator temperature is placed on the evaporator 14 while an outside-air temperature sensor T3 is placed near the evaporator 14. Then, based on detection signals of the discharge-temperature sensor T1, the evaporator-temperature sensor T2, the outside-air temperature sensor T3 and the pressure sensor (HPS) 16, a boil-up control section (not shown) controls the compressor 11, the expansion valve 13, the blower fan 15 and the like.

Also, one end of a pipe L11 is connected to a boil-up forward connecting portion 21c (shown in FIG. 2) provided at a lower portion of a hot-water storage tank 21, and the other end of the pipe L11 is connected to one end (secondary side) of the condenser 12. Provided on the pipe L11 is a boil-up circulating pump 24 for feeding out water from a lower portion of the hot-water storage tank 21 toward the condenser 12. One end of a pipe L12 is connected to the other end (secondary side) of the condenser 12 of the heat pump unit 1, and the other one of the pipe L12 is connected to an input side of a boil-up three-way valve 25. One end of a pipe L24 is connected to one output side of the boil-up three-way valve 25, and the other end of the pipe L24 is connected to one input side of a heating-use three-way valve 32. Further, the one input side of the heating-use three-way valve 32 is connected via a pipe L35 to a second heating-forward connecting portion 21d (shown in FIG. 2 and serving also as a first boil-up return connecting portion) provided at an upper portion of the hot-water storage tank 21. On the other hand, one end of a pipe L23 is connected to the other output side of the boil-up three-way valve 25, and the other end of the pipe L23 is connected to a lower side of the hot-water storage tank 21.

On the pipe L11 in the secondary-side upstream of the condenser 12 is placed an intake water temperature sensor T4 for detecting an intake water temperature. An outgoing hot-water temperature sensor T5 for detecting an outgoing hot-water temperature is placed on the pipe L12 in the secondary-side downstream of the condenser 12.

The hot-water storage tank 21 is formed into a generally cylindrical shape surrounded by a heat insulating material (not shown). A hot-water supplying heat exchanger 22 formed of a coil-like pipe is placed in the hot-water storage tank 21. This hot-water supplying heat exchanger 22 has a lower-side coil portion 22a and an upper-side coil portion 22b connected to each other with a specified spacing. One end of a water supply pipe L21 to be connected to the hot-water storage tank 21 is connected to a water supply port 21a connected to a lower end of the lower-side coil portion 22a, and one end of a hot-water supply pipe L22 to be connected to the hot-water storage tank 21 is connected to an upper end of the upper-side coil portion 22b. The water supply pipe L21 and the hot-water supply pipe L22 are connected to each other by a hot-water supply mixing valve 31 outside the hot-water storage tank 21. Also, a hot-water temperature sensor T13 is placed on one side of the hot-water supply pipe L22 downstream of the hot-water supply mixing valve 31.

Water supplied from outside via the water supply pipe L21 flows from the lower end side of the lower-side coil portion 22a toward the upper end side of the upper-side coil portion 22b, thus being supplied to a water heater (not shown) via the hot-water supply pipe L22.

The hot-water storage tank 21 has, on a side face, five temperature sensors T6-T10 spaced from one another as listed in this order from upper toward lower side. A water temperature of an upper-side portion within the hot-water storage tank 21 is detected by the temperature sensor T6, and a water temperature of an intermediate portion within the hot-water storage tank 21 is detected by the temperature sensor T8. Also, a water temperature in the hot-water storage tank 21 is detected by the temperature sensor T7 at an intermediate point between the temperature sensor T6 and the temperature sensor T8. Further, a water temperature of a lower-side portion within the hot-water storage tank 21 is detected by the temperature sensor T10, and a water temperature in the hot-water storage tank 21 is detected by a temperature sensor T9 at an intermediate point between the temperature sensor T8 and the temperature sensor T10. Whereas five temperature sensors T6-T10 for detecting water temperatures in the hot-water storage tank 21 are provided in this embodiment, it is enough to provide a plurality of four or more temperature sensors for detecting water temperatures in the hot-water storage tank. A plurality of temperature sensors makes it possible to decide how high the supply hot water has been stored in the hot-water storage tank as counted from its top.

In addition, an electrothermal heater 23 is placed in the hot-water storage tank 21 and between the lower-side coil portion 22a and the upper-side coil portion 22b.

The hot-water storage tank 21, the hot-water supplying heat exchanger 22, the heater 23, the boil-up circulating pump 24, the boil-up three-way valve 25 and the temperature sensors T6-T10 constitute the hot-water storage section 2 (shown in FIG. 1).

Next, one end of a pipe L31 is connected to the other input side of the heating-use three-way valve 32, and the other end of the pipe L31 is connected to a first heating-forward connecting portion 21f (shown in FIG. 2) of the hot-water storage tank 21. The first heating-forward connecting portion 21f is provided at a position between the upper-side coil portion 22b and the electrothermal heater 23 in the hot-water storage tank 21.

Then, the output side of the heating-use three-way valve 32 is connected to one input side of a heating-use mixing valve 33, and one end of a pipe L32 is connected to the output side of the heating-use mixing valve 33. On the pipe L32 are provided a heating-forward temperature sensor T11 and a heating-use circulating pump 34 in an order from the heating-use mixing valve 33 side. Radiators 41, 42, . . . as an example of heating terminals are connected by their one end on the pipe L32 in the downstream side of the heating-use circulating pump 34. Also, one end of a pipe L33 is connected to a heating-return connecting portion 21g (shown in FIG. 3) as a heating return port provided at a lower portion of the hot-water storage tank 21, and the other ends of the radiators 41, 42, . . . are connected to the other end side of the pipe L33. A heating-return temperature sensor T12 is placed on the pipe L33. Also, one side of the pipe L33 closer to the hot-water storage tank 21 than the heating-return temperature sensor T12 and the other input side of the heating-use mixing valve 33 are connected to each other by a pipe L34.

Based on detection signals from the temperature sensors T6-T10, the heating-forward temperature sensor T11, the heating-forward temperature sensor T11 and the heating-return temperature sensor T12, a heating hot-water supply control section (not shown) controls the boil-up three-way valve 25, the heating-use three-way valve 32, the boil-up circulating pump 24 and the heating-use circulating pump 34.

The heating-forward temperature sensor T11, the heating-return temperature sensor T12, the hot water supply mixing valve 31, the heating-use three-way valve 32, the heating-use circulating pump 34 and the heating and hot-water supply control section constitute a heating and water-heating section to be driven by a commercial power supply.

In the hot-water storage type heating and hot-water supply device constructed as described above, the output side of the boil-up three-way valve 25 of the hot-water storage section 2 is switched to the pipe L24 side, the compressor 11 of the heat pump unit 1 is driven and operation of the blower fan 15 is started. Further, the boil-up circulating pump 24 of the hot-water storage section 2 is driven. Then, a high-pressure gas refrigerant discharged from the compressor 11 is subjected to heat radiation and condensation by the condenser 12 to form a liquid refrigerant, which is thereafter reduced in pressure by the expansion valve 13 to form a low-pressure refrigerant, which absorbs heat from outside air so as to evaporate. Then, the low-pressure gas refrigerant evaporated by the evaporator 14 returns to the suction side of the compressor 11. In this case, water that has flowed into the secondary side of the condenser 12 from a lower portion (boil-up forward connecting portion 21c) of the hot-water storage tank 21 via the pipe L11 by the boil-up circulating pump 24 is heated by the condenser 12 to be hot water of near 90° C., and returns into the hot-water storage tank 21 via the pipe L12, the boil-up three-way valve 25, the pipe L24, the pipe L35 and the second heating-forward connecting portion (first boil-up return connecting portion) 21d. Thus, water within the hot-water storage tank 21 is circulated via the boil-up circulating pump 24 and the condenser 12, so that the water within the hot-water storage tank 21 is boiled up. Hot water in the hot-water storage section 2 is so distributed as to form such hot water layers (temperature distribution) that higher-temperature hot water is located on an upper side while lower-temperature hot water is located on a lower side.

In addition, at start-up of the heat pump unit 1 or the like, if the hot water that comes out from the condenser 12 of the heat pump unit 1 has not yet come to enough high temperature, the three-way valve 25 is so controlled that the hot water does not return to an upper portion of the hot-water storage tank 21 via the pipe L24 or the like, but does return to a second boil-up return port located at a lower portion of the hot-water storage tank 21 via the pipe L23. The return port is changed over depending on the temperature of the hot water as shown above for the reason that returning hot water that has not yet come to enough high temperature to the upper portion of the hot-water storage tank 21 may cause the temperature distribution within the hot-water storage tank 21 to be disturbed, and the reason is to prevent this disturbance. Changeover of the three-way valve 25 is performed based on an output of the outgoing hot-water temperature sensor T5 provided between the condenser 12 and the boil-up three-way valve 25.

Next, for heating operation, the heating-use three-way valve 32 of a heating and water-heating section 3 is changed over so that the pipe L31 and the heating-use mixing valve 33 are connected to each other, followed by driving the heating-use circulating pump 34. Then, hot water located in the intermediate portion of the hot-water storage tank 21 flows into the radiators 41, 42, . . . via the pipe L31, the heating-use three-way valve 32, the heating-use mixing valve 33 and the heating-use circulating pump 34. Then, hot water coming out from the radiators 41, 42, . . . returns through the lower portion of the hot-water storage tank 21 via the pipe L33 into the hot-water storage tank 21.

In this case, based on detection signals from the temperature sensors T6-T10 as well as a heating-forward temperature detected by the heating-forward temperature sensor T11 and a heating-return temperature detected by the heating-return temperature sensor T12, the heating-use mixing valve 33 and the heating-use circulating pump 34 are controlled by the heating hot water supply control section (not shown). Also, heating operation and boiling-up by the heat pump unit 1 may be performed simultaneously.

For changeover of the heating-use three-way valve 32, in a case where the high-temperature region of the hot water within the hot-water storage tank 21 is present over a range from the upper portion of the hot-water storage tank 21 to a proximity of a first heating-forward port 51 and where enough high-temperature water is stored, the heating-use three-way valve 32 is so controlled that hot water is taken out from the intermediate portion of the hot-water storage tank 21 via the pipe L31 so as to be circulated on the radiators 41, 42, . . . side. Also, without enough storage of hot water, for example, in a case where the high-temperature region of the hot water within the hot-water storage tank 21 does not reach a proximity of the first heating-forward port 51 so that the high-temperature water is present only in the upper portion of the hot-water storage tank 21, the heating-use three-way valve 32 is controlled so that the hot water is taken out through a second heating-forward port 52 so as to be circulated on the radiator side. This changeover of the heating-use three-way valve 32 is fulfilled by the heating hot water supply control section. That is, based on signals from the plurality of temperature sensors T6-T10 for detecting hot-water temperatures of the individual portions within the hot-water storage tank 21, the heating hot water supply control section decides the hot water quantity of the high-temperature water to make changeover of the heating-use three-way valve 32. The changeover of the heating-use three-way valve 32 may also be done based on only the temperature sensor T8 positioned slightly lower than the first heating-forward port 51 and roughly equal in height to the electrothermal heater 23.

Next, for execution of hot water supply operation, as the hot-water supplying faucet of the hot-water supply device (not shown) is opened, water supplied by water supply pressure applied from outside flows to the hot-water supply device via the water supply pipe L21, the hot-water supplying heat exchanger 22 and the hot water supply pipe L22, so that hot water heated by the hot-water supplying heat exchanger 22 is supplied to the hot-water supply device. In this case, based on a hot-water temperature detected by the hot-water temperature sensor T13, the heating and hot-water supply control section controls the hot-water supply mixing valve 31 to adjust the temperature of hot water supplied to the hot-water supply device to a desired temperature. In addition, at least one of the heating operation or the boiling-up by the heat pump unit 1 may be performed simultaneously with the hot-water supply, where individual operations are under no constraints.

Figure 2:
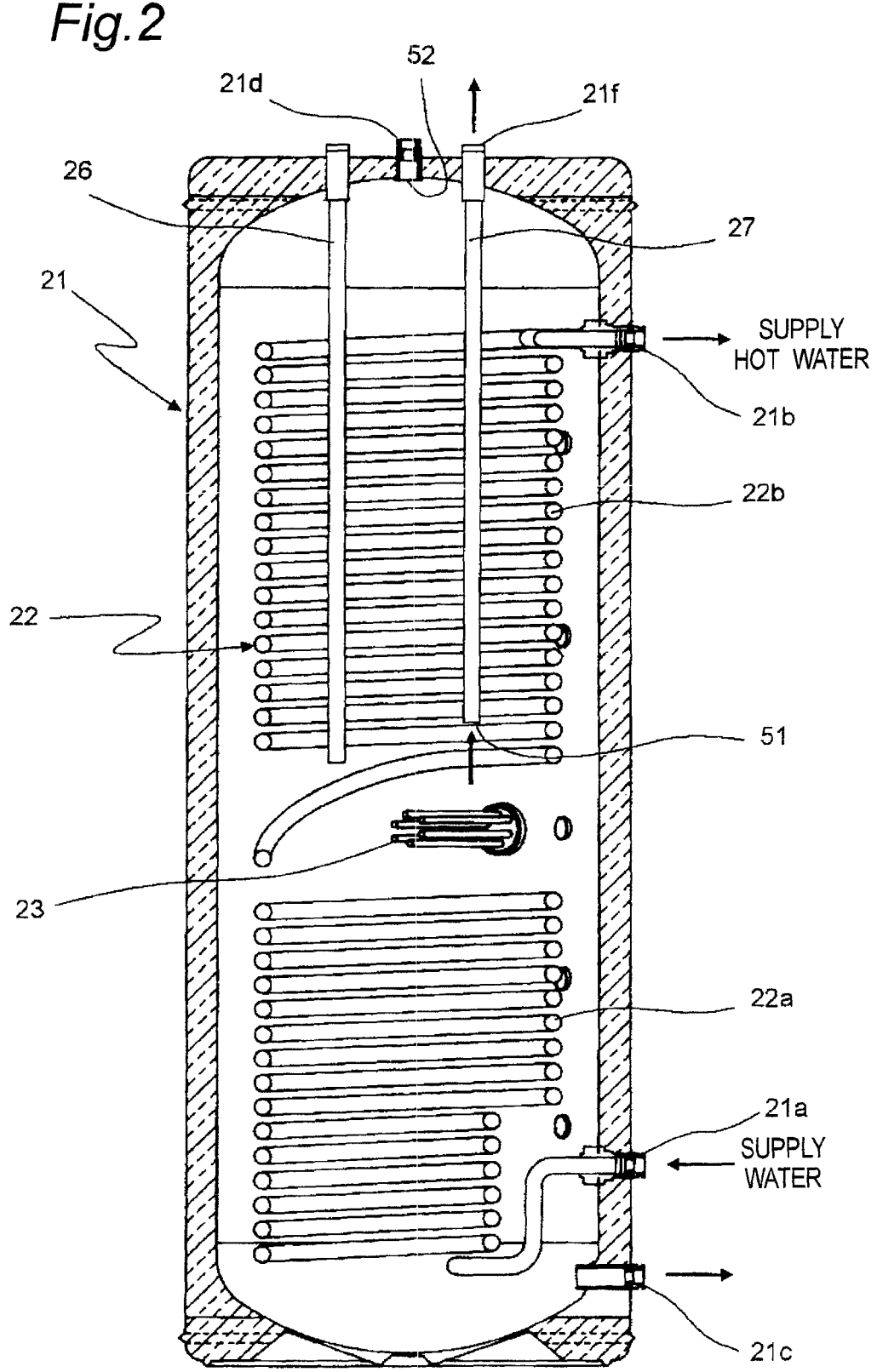
FIG. 2 is a longitudinal sectional view of a hot-water storage tank of the hot-water storage type heating and hot-water supply device.
Figure 3:
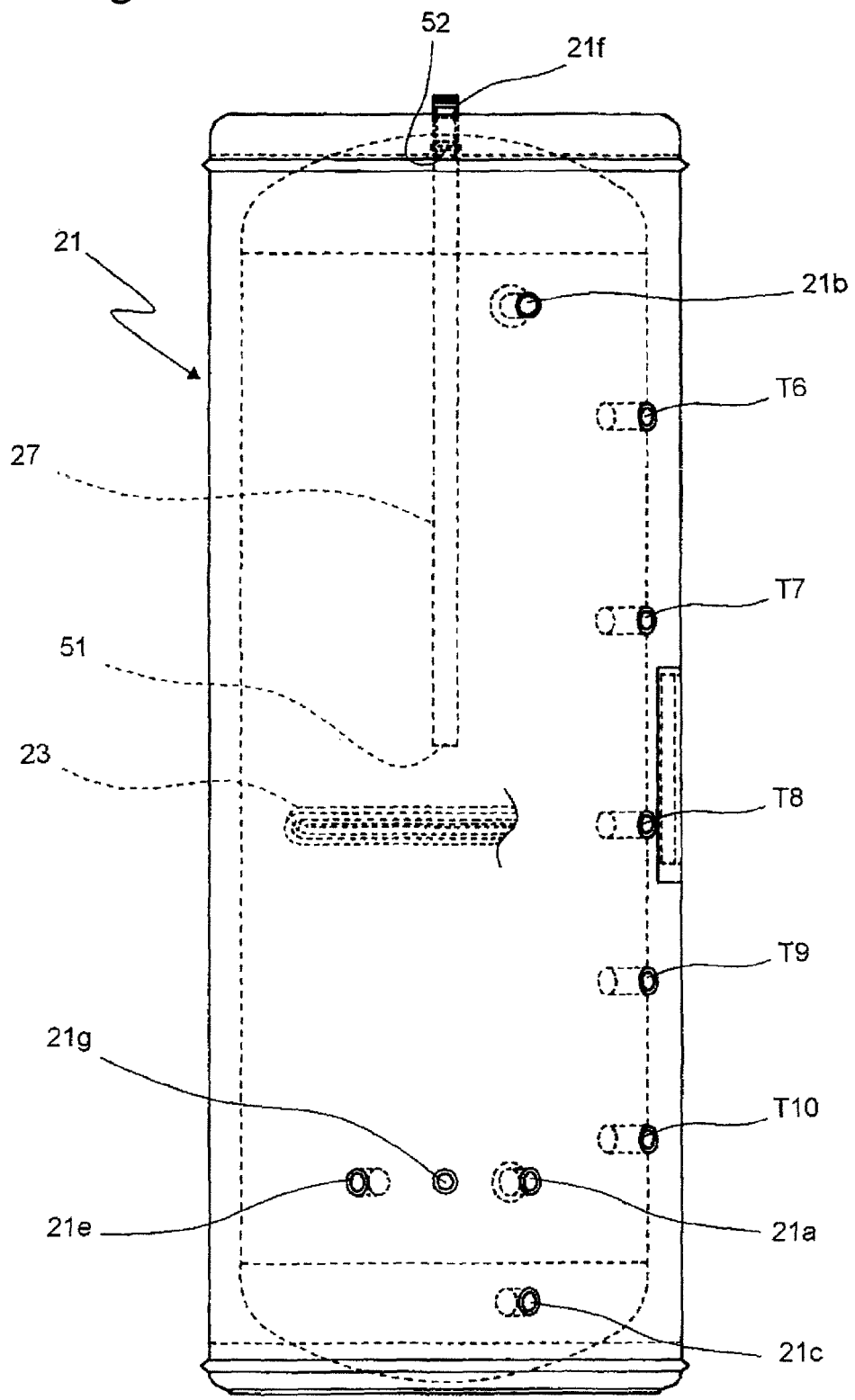
FIG. 3 is a side view of the hot-water storage tank of the hot-water storage type heating and hot-water supply device.
Figure 4:
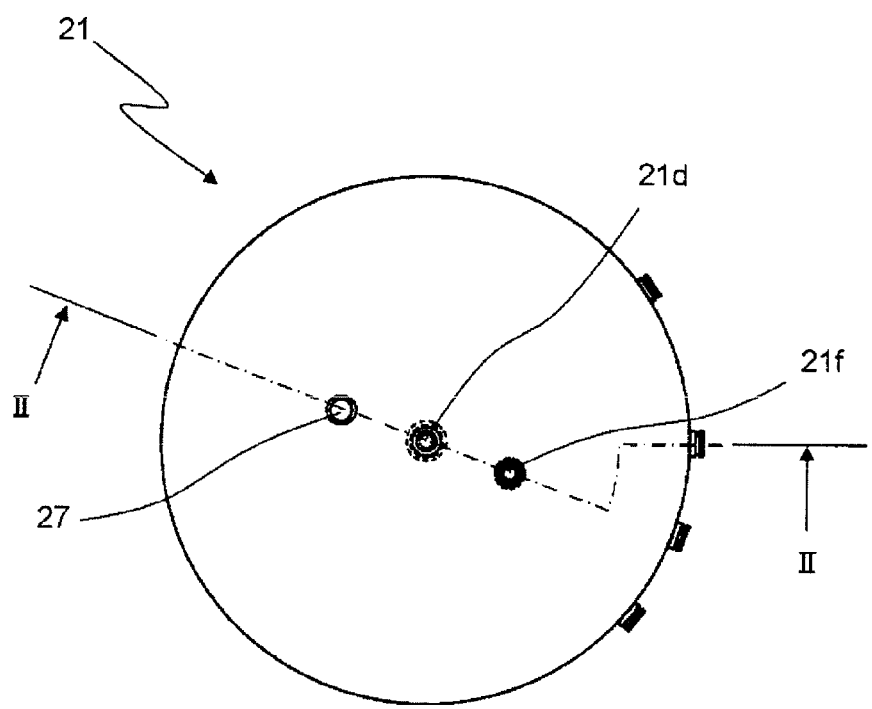
FIG. 4 is a top view of the hot-water storage tank of the hot-water storage type heating and hot-water supply device.

FIG. 2 is a longitudinal sectional view of the hot-water storage tank 21 of the hot-water storage type heating and hot-water supply device. FIG. 3 is a side view of the hot-water storage tank of the hot-water storage type heating and hot-water supply device. FIG. 4 is a top view of the hot-water storage tank of the hot-water storage type heating and hot-water supply device. FIG. 2 is a sectional view taken along the line II-II of FIG. 4. In FIGS. 2 to 4, reference sign 21a denotes a water supply port, 21b denotes a hot-water supply port, 21c denotes a boil-up forward connecting portion, 21d denotes a second heating-forward connecting portion, 21e denotes a second boil-up return connecting portion, 21f denotes a first heating-forward connecting portion, 21g denotes a heating-return connecting portion, 26 denotes a sacrificial anode, and T6-T10 denote temperature sensors. As shown in FIG. 4, a lower end of a pipe 27 provided generally parallel to the sacrificial anode 26 so as to extend from the first heating-forward connecting portion 21f to the hot-water storage tank 21 is opened near and upward of the electrothermal heater 23, so that hot water for heating use is taken out from the intermediate portion in the hot-water storage tank 21.

As shown in FIGS. 2 to 4, a hot-water supplying heat exchanger 22 comprised of a coil-like pipe is placed in a substantially entire vertical region of the hot-water storage tank 21, which is surrounded by a heat insulating material (not shown) and formed into a generally cylindrical shape. This hot-water supplying heat exchanger 22 has a lower-side coil portion 22a and an upper-side coil portion 22b connected to each other with a specified spacing.

According to the hot-water storage type heating and hot-water supply device constructed as described above, in the hot-water storage tank 21 in which hot water heated by the heat pump unit 1 has been stored and in which the hot-water temperature increases gradually higher and higher from lower toward upper side, low-temperature supply hot water that has flowed in from the lower side of the hot-water supplying heat exchanger 22 is heat-exchanged in a hot-water region of relatively low temperatures on the lower side within the hot-water storage tank 21, and heat-exchanged in upper-side higher-temperature hot-water region within the hot-water storage tank 21 while flowing upward in the hot-water supplying heat exchanger 22, thus being discharged as high-temperature supply hot water. In this case, the supply hot water flows from lower to upper side according to the temperature gradient in the hot-water storage tank 21 while being heated by heat exchange, so that the temperature distribution in the hot-water storage tank 21 is never disturbed, allowing high heat exchange efficiency to be obtained. Accordingly, with a simple construction, the heat exchange efficiency of the hot-water supplying heat exchanger 22 can be improved, and high-temperature hot water can be supplied. Further, low-temperature water on the lower side within the hot-water storage tank 21 is heated by the heat pump unit 1 while the vertical temperature gradient in the hot-water storage tank is maintained, by which the COP (Coefficient Of Performance) of the heat pump unit 1 can be improved.

Depending on a boil-up state, a temperature distribution of about 40° C.-90° C. from lower to upper side is formed in the hot-water storage tank 21, where temperature differences between warm water in the hot-water storage tank 21 and water flowing within the hot-water supplying heat exchanger 22 is larger on the lower side on which low-temperature water flows in and increasingly smaller on the upper side more and more. Therefore, in terms of uniformization of heat exchange quantity in the hot-water supplying heat exchanger, the lower-side portion of the hot-water supplying heat exchanger showing larger temperature differences can be made larger in pitch. Thus, shortening the length of the lower-side portion of the hot-water supplying heat exchanger makes it possible to reduce the vertical size of the hot-water storage tank so that size and weight reduction of the hot-water storage tank can be achieved.

By using a coil-like pipe for the hot-water supplying heat exchanger 22, the hot-water supplying heat exchanger 22 can be placed efficiently over the generally entire vertical region of the hot-water storage tank 21.

Also, in case of capacity deficiency or failures of the heat pump unit 1, hot water in the intermediate portion within the hot-water storage tank 21 is heated by using the electrothermal heater 23, thus allowing the heating power of the electrothermal heater 23 to be used as an auxiliary. Furthermore, in a failure of the heat pump unit 1, heating the hot water at the intermediate portion in the hot-water storage tank 21 by using the electrothermal heater 23 allows the start-up of hot-water supply and heating to be improved in comparison to the case in which the electrothermal heater 23 is placed on the lower side in the hot-water storage tank 21 so that more time is taken for boil-up.

In addition, control of the electrothermal heater 23 may also be performed based on, for example, an output of the temperature sensor T8 roughly equal in height to the electrothermal heater 23 or the temperature sensor T7 located slightly upper than the electrothermal heater 23. More specifically, when a water temperature detected by the temperature sensor T7 is less than a specified temperature (i.e., when specified high-temperature water reaches only a level upper than the temperature sensor T7), it is decided that the quantity of high-temperature water of the hot-water storage tank 21 is insufficient, followed by turning on the electrothermal heater 23, continuing the on-state of the electrothermal heater 23 until the water temperature detected by the temperature sensor T8 becomes a specified temperature or higher (i.e., a specified high-temperature water reaches the position of the temperature sensor T8), and turning off the electrothermal heater 23 at a time point when the water temperature detected by the temperature sensor T8 becomes the specified temperature or higher. Turn-on and -off of the heater is controlled not by using the temperature sensor T8 positioned roughly equal in height to the electrothermal heater 23 but by using the temperature sensor T7 positioned slightly higher than the electrothermal heater 23 and the temperature sensor T8 positioned roughly equal in height to the electrothermal heater 23 with a view to preventing hunting. In addition, as apparent from FIG. 3, the first heating-forward port 51 is positioned at a height between the temperature sensor T7, which is in the second-order place from the top, and the temperature sensor T8, which is in the third-order place from the top and which is roughly equal in height to the electrothermal heater 23.

For example, when the switching control of the heating-forward port based on the temperature sensor T8 as well as the switching control of turn on/off of the electrothermal heater 23 based on the temperature sensors T7, T8 are performed in combination, it becomes particularly effective to provide the first heating-forward port 51 near upward of the electrothermal heater 23. In such a case, (1) if the high-temperature water increased to a specified temperature is present so as to reach a position lower than the temperature sensor T8, then the electrothermal heater 23 is turned off and the heating-forward port is switched to the first heating-forward port 51, (2) if the high-temperature water has decreased to a position between the temperature sensors T7, T8, then the electrothermal heater 23 is turned off and the heating-forward port is switched to the second heating-forward port 52, and (3) further, if the high-temperature water has decreased to a position upper than the temperature sensor T7, then the electrothermal heater 23 is turned on and the heating-forward port is switched to the second heating-forward port 52, where the turned-on state of the heater is continued until the high-temperature water increases again to the position of the temperature sensor T8. As a result of this, the state is again (1) that enough high-temperature water is present.

In this case, since the electrothermal heater 23 is located not in a lower portion of the hot-water storage tank 21 but at a position near and downward of the first heating-forward port 51, the time for increasing the temperature of the water between the temperature sensors T8, T7 to a specified temperature, i.e., the time for returning from the state of (3) to the state of (1) can be shortened. Accordingly, the time during which the second heating-forward port 52 has to be used can be reduced, so that the device is suitable particularly for hot-water supply and heating systems in which the upper-part hot water in the tank is mainly used for hot-water supply use while the lower-part hot water in the hot-water storage tank 21 is used for heating use.

Also, using carbon dioxide ($CO_2$) as the refrigerant for the heat pump unit 1 makes it possible to give contribution to global warming countermeasures, and its condensing temperature being higher than that of HFC refrigerant or the like makes it possible to raise the hot-water temperature produced by the heat pump unit 1. In this case, the lower the boil-up return temperature is, the higher the COP (Coefficient Of Performance) of the heat pump unit 1 becomes, which is effective particularly for heat pumps using $CO_2$ refrigerant.

Further, according to the hot-water storage type heating and hot-water supply device, with a simple construction, the heat exchange efficiency of the hot-water supplying heat exchanger 22 can be improved, and high-temperature hot water can be supplied. Further, under the condition that the upper-side region in the hot-water storage tank 21 is used primarily as a heat source for hot-water supply while the lower-side region is used primarily as a heat source for heating, the heat source of the upper-side region within the hot-water storage tank 21 can be effectively utilized to supply high-temperature hot water while the heat source of the lower-side region within the hot-water storage tank 21 can be effectively utilized for heating without affecting the high-temperature hot-water supply.

Besides, delivering hot water from the intermediate region within the hot-water storage tank 21 to the radiators 41, 42, . . . by the heating-use circulating pump 34, the hot water in the upper-side region in the hot-water storage tank 21 can be maintained in a high-temperature state for use of hot-water supply, so that deterioration of hot-water supply power by heating can be prevented.

In addition, the temperature sensors T1-T13 of the first embodiment are provided by thermistors, but other devices such as thermocouples are also usable therefor.

Second Embodiment

Figure 5:
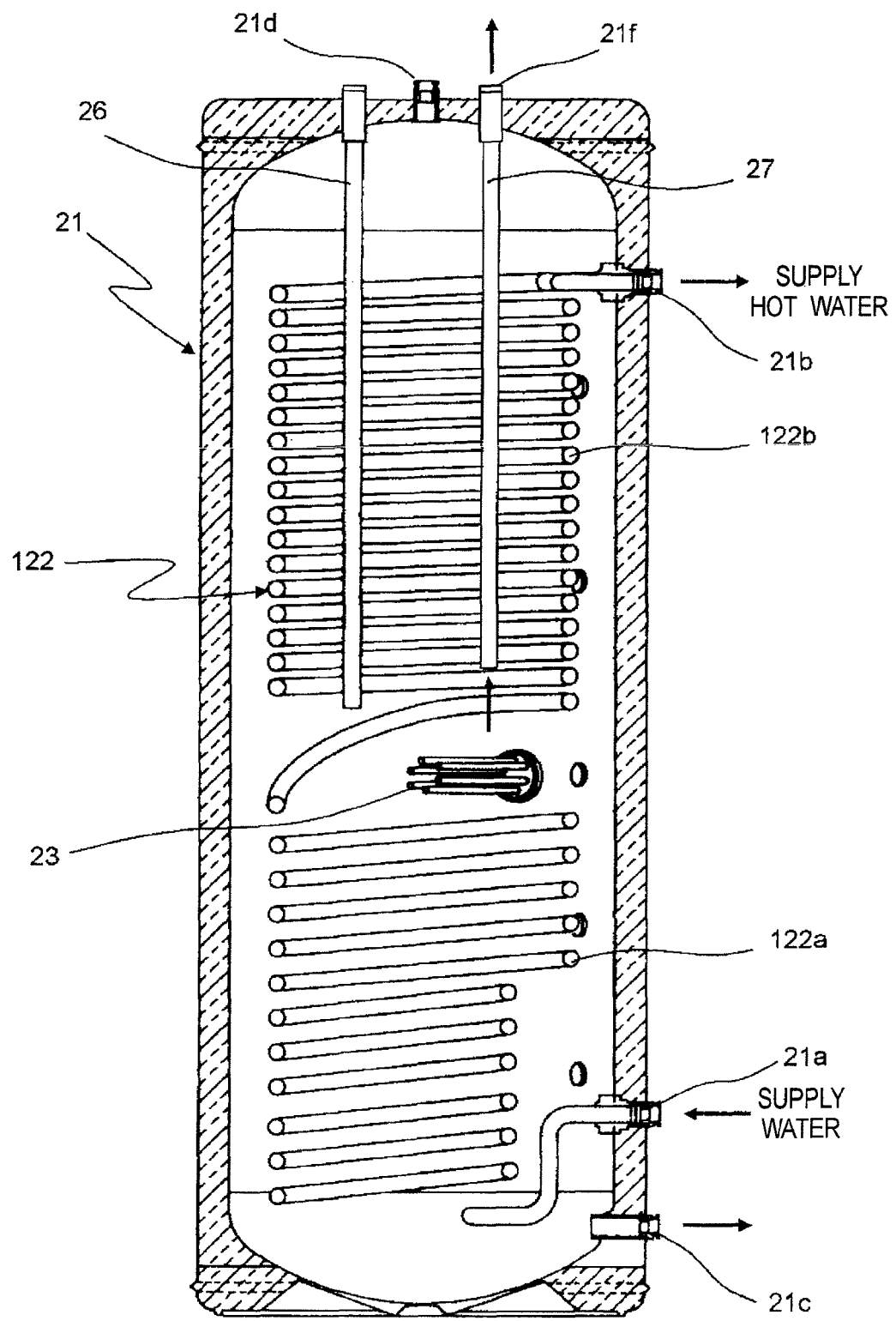
FIG. 5 is a longitudinal sectional view of a hot-water storage tank of a hot-water storage type heating and hot-water supply device with use of the hot-water storage type hot-water supply device according to a second embodiment of the invention.

FIG. 5 is a longitudinal sectional view of a hot-water storage tank of a hot-water storage type heating and hot-water supply device with use of a hot-water storage type hot-water supply device according to a second embodiment of the invention.

In this hot-water storage type heating and hot-water supply device of the second embodiment, a lower-side coil portion 122a of a hot-water supplying heat exchanger 122 placed in the hot-water storage tank 21 is larger while an upper-side coil portion 122b is smaller in pitch. More specifically, the pitch ratio of the upper-side coil portion 122b to the lower-side coil portion 122a is roughly 0.7. It is noted here that each of the lower-side coil portion 122a and the upper-side coil portion 122b is wound up at an equal interval.

The hot-water storage type heating and hot-water supply device of the second embodiment has the same effects as those of the hot-water storage type heating and hot-water supply device of the first embodiment.

Also, the lower-side coil portion 22a of the hot-water supplying heat exchanger 22 is made larger in pitch, i.e. sparsely arranged, in the relatively low-temperature hot-water region on the lower side within the hot-water storage tank 21, by which heat exchange is suppressed so that temperature increase is suppressed in the hot-water region on the lower side within the hot-water storage tank 21. On the other hand, in the higher-temperature hot-water region on the upper side within the hot-water storage tank 21, as the water flows toward the upper side of the hot-water supplying heat exchanger 22, the upper-side coil portion 22b of the hot-water supplying heat exchanger 22 is made smaller in pitch, i.e. densely arranged, by which heat exchange is fulfilled enough so that high-temperature supply hot water can be obtained. Thus, with a larger temperature gradient between upper and lower portions within the hot-water storage tank 21, lower-temperature water on the lower side within the hot-water storage tank 21 is heated by the heat pump unit 1, thus allowing the COP of the heat pump unit 1 to be further improved.

In the second embodiment, the upper-side coil portion 22b is made smaller in pitch, or densely arranged, than the lower-side coil portion 22a in the hot-water supplying heat exchanger 22. However, instead of adjusting the pitch, the pipe length or leading diameter of the lower-side coil portion may be set smaller.

Also in the second embodiment, the heat exchange power of the hot-water supplying heat exchanger per unit volume of the hot-water storage tank is so set as to be higher in the upper-side portion than in the lower-side portion by providing a larger pitch of the lower-side coil portion 122a of the hot-water supplying heat exchanger 122 placed within the hot-water storage tank 21 as well as a smaller pitch of the upper-side coil portion 122b. However, instead of adjusting the pitch, the pipe length or leading diameter of the lower-side coil portion may be set smaller.

Also, for example, with use of inner-surface machined tubes for heat transfer tubes of the annular coil in the upper-side portion of the hot-water supplying heat exchanger, the heat-transfer-tube portion in the upper-side portion can be enhanced in terms of heat transfer rate in comparison to the lower-side portion. Alternatively, the inner diameter of the heat transfer tubes of the annular coil in the upper-side portion of the hot-water supplying heat exchanger may be made smaller than the inner diameter of heat transfer tubes of the annular coil in the lower-side portion, so that the flow velocity of water flowing through within the heat transfer tubes in the upper-side portion is increased, thus improving the heat transfer rate at the heat transfer tube portions in the upper-side portion in comparison to the lower-side portion.

The first and second embodiments have been described above with regard to the hot-water storage type heating and hot-water supply device. However, the present invention of course may also be applied to hot-water storage type hot-water supply device for performing the hot-water supply only.

Also in the first and second embodiments, configuration and pitch of the lower-side coil portion 22a (122a) and the upper-side coil portion 22b (122b) of the hot-water supplying heat exchanger 22 (122) may be set appropriately according to the configuration of the hot-water storage tank or the like.

Also, although the electrothermal heater 23 is used as an example of the heater placed at an intermediate portion within the hot-water storage tank 21 in the first and second embodiments, yet the heater is not limited to this and other heating means is also usable. Besides, as the heating terminal, without limitation to radiators, floor heating panel, fan coil or other means may also be used.

Third Embodiment

Figure 6:
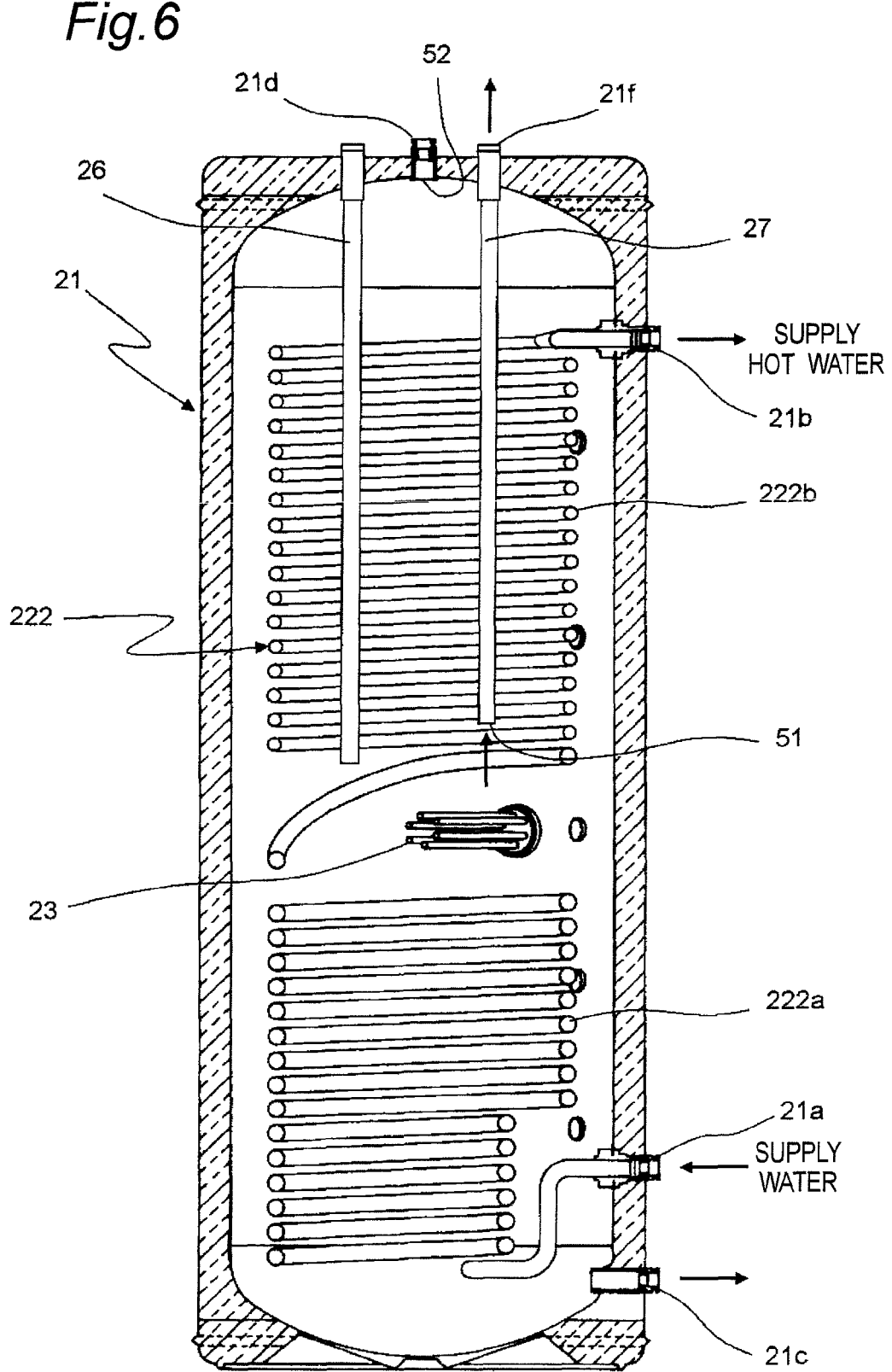
FIG. 6 is a longitudinal sectional view of a hot-water storage tank of a hot-water storage type heating and hot-water supply device with use of the hot-water storage type hot-water supply device according to a third embodiment of the invention.

FIG. 6 is a longitudinal sectional view of a hot-water storage tank of a hot-water storage type heating and hot-water supply device with use of a hot-water storage type hot-water supply device according to a third embodiment of the invention. This hot-water storage type heating and hot-water supply device of the third embodiment is the same in construction as the hot-water storage type heating and hot-water supply device of the first embodiment except the hot-water supplying heat exchanger, and the same component members are designated by the same reference signs with their description omitted.

In this hot-water storage type heating and hot-water supply device of the third embodiment, as shown in FIG. 6, a hot-water supplying heat exchanger 222 formed of a coil-like pipe is placed in the hot-water storage tank 21. This hot-water supplying heat exchanger 222 has a lower-side coil portion 222a and an upper-side coil portion 222b connected to each other with a specified spacing, where the upper-side coil portion 222b is smaller in inner diameter than the lower-side coil portion 222a.

The hot-water storage type heating and hot-water supply device of the third embodiment has the same effects as those of the hot-water storage type heating and hot-water supply device of the first embodiment, and moreover by making the upper-side coil portion 222b of the hot-water supplying heat exchanger 222 set smaller in inner diameter, the flow velocity in the upper-side coil portion 222b is increased, thus improving the heat transfer rate. As a result, heat exchange is fulfilled enough in the upper-side high-temperature hot-water region within the hot-water storage tank 21, so that high-temperature supply hot water can be obtained.

Fourth Embodiment

Figure 7:
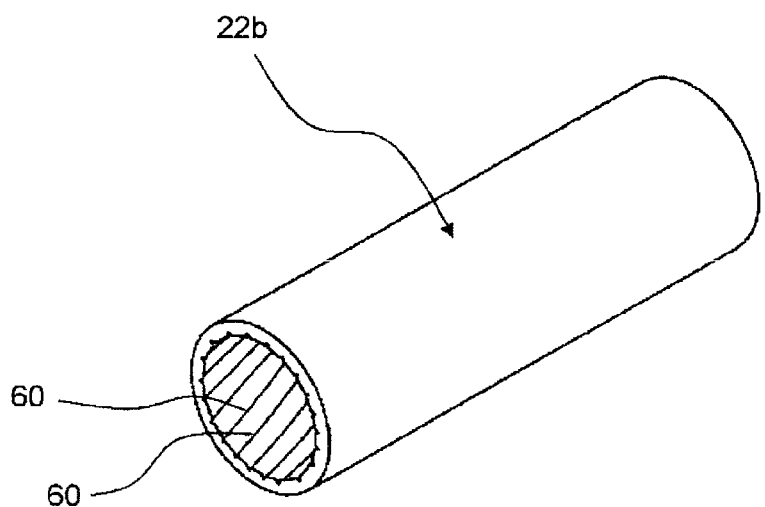
FIG. 7 is a partial perspective view showing an internal structure of the hot-water supplying heat exchanger placed within a hot-water storage tank of a hot-water storage type heating and hot-water supply device with use of a hot-water storage type hot-water supply device according to a fourth embodiment of the invention.

FIG. 7 is a partial perspective view showing an internal structure of a hot-water supplying heat exchanger placed within a hot-water storage tank of a hot-water storage type heating and hot-water supply device with use of a hot-water storage type hot-water supply device according to a fourth embodiment of the invention. This hot-water storage type heating and hot-water supply device of the fourth embodiment is the same in construction as the hot-water storage type heating and hot-water supply device of the first embodiment except the hot-water supplying heat exchanger, and so FIG. 1 is used also for this embodiment.

In the hot-water storage type heating and hot-water supply device of the fourth embodiment, a hot-water supplying heat exchanger 22 formed of a coil-like pipe placed in the hot-water storage tank 21 has a lower-side coil portion 22a and an upper-side coil portion 22b connected to each other with a specified spacing. As shown in FIG. 7, a plurality of spiral-shaped grooves 60 are provided in the inner surface of the upper-side coil portion 22b (inner-surface machined tube). Also, the lower-side coil portion 22a is an inner-surface plain tube.

The hot-water storage type heating and hot-water supply device of the fourth embodiment has the same effects as those of the hot-water storage type heating and hot-water supply device of the first embodiment, and moreover the heat transfer rate of the upper-side coil portion 22b is improved by the grooves 60 provided in the inner surface of the upper-side coil portion 22b of the hot-water supplying heat exchanger 22. Thus, heat exchange is fulfilled enough in the upper-side high-temperature hot-water region within the hot-water storage tank 21, so that high-temperature supply hot water can be obtained.

In addition, the grooves provided in the inner surface of the upper-side coil portion of the hot-water supplying heat exchanger is not limited to a spiral shape, and the grooves may be in other shapes.

Fifth Embodiment

Figure 8:
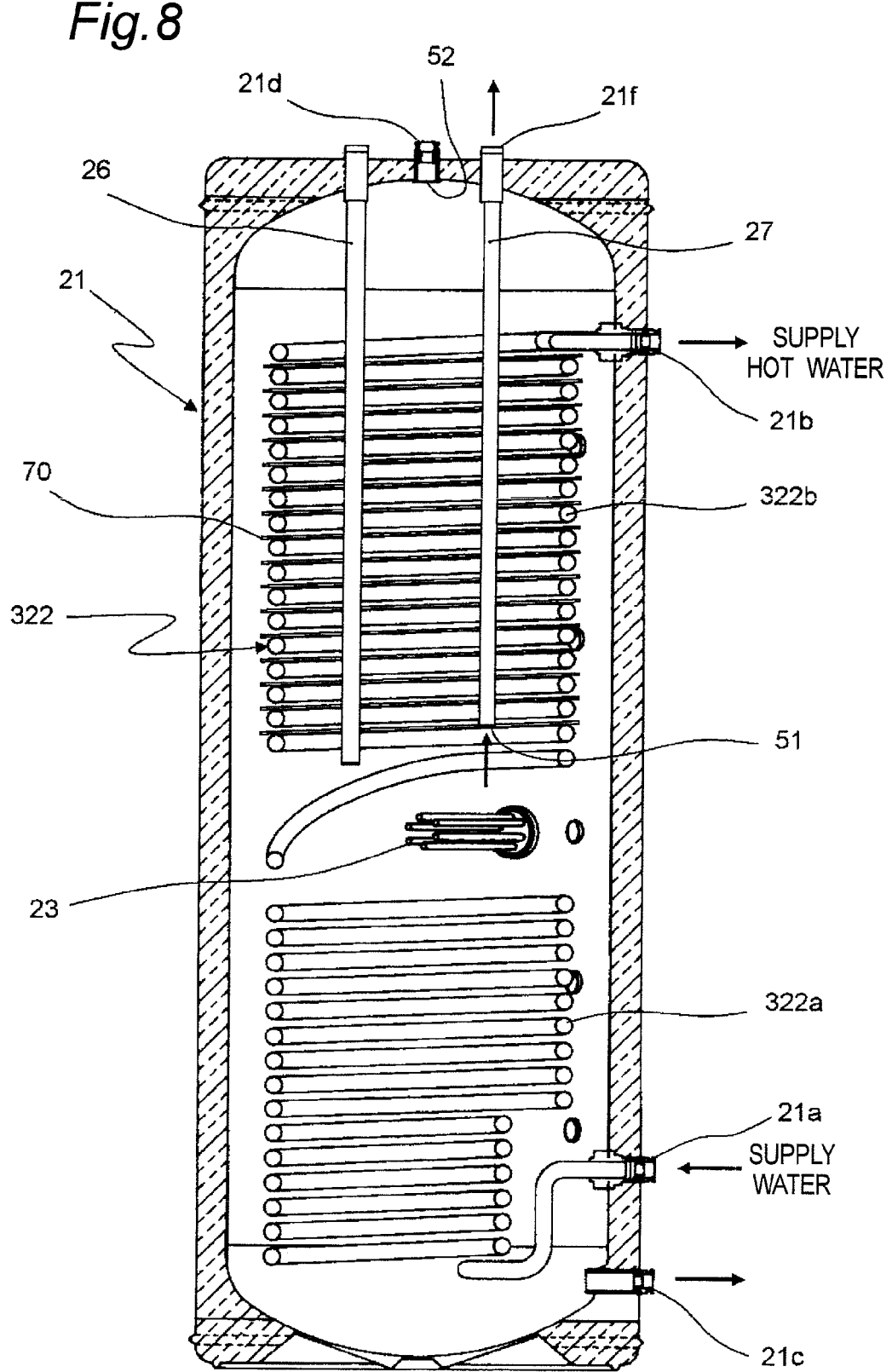
FIG. 8 is a longitudinal sectional view of a hot-water storage tank of a hot-water storage type heating and hot-water supply device with use of the hot-water storage type hot-water supply device according to a fifth embodiment of the invention.

FIG. 8 is a longitudinal sectional view of a hot-water storage tank of a hot-water storage type heating and hot-water supply device with use of a hot-water storage type hot-water supply device according to a fifth embodiment of the invention. This hot-water storage type heating and hot-water supply device of the fifth embodiment is the same in construction as the hot-water storage type heating and hot-water supply device of the first embodiment except fins of the hot-water supplying heat exchanger, and the component members are designated by the same reference signs with their description omitted.

Figure 9:
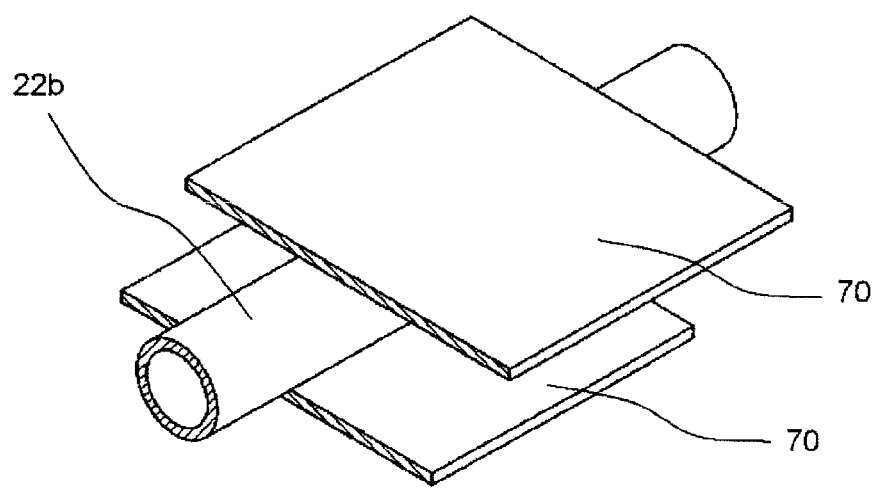
FIG. 9 is a main-part perspective view of a hot-water supplying heat exchanger placed within the hot-water storage tank.

In the hot-water storage type heating and hot-water supply device of the fifth embodiment, as shown in FIG. 8, a hot-water supplying heat exchanger 322 formed of a coil-like pipe is placed in the hot-water storage tank 21. The hot-water supplying heat exchanger 322 has a lower-side coil portion 322a and an upper-side coil portion 322b connected to each other with a specified spacing, and plate-shaped fins 70 are provided on the upper side of the outer peripheral surface of the upper-side coil portion 322b (see FIG. 9).

The plate-shaped fins 70 are each formed of a C-type ring-shaped plate material which has an outer diameter and an inner diameter corresponding to the coil shape of the upper-side coil portion 322b in a plan view and a circumferential part of which is cut out. This cutout portion of the plate-shaped fins 70 serves as a pipe-inserting portion in which a pipe is inserted. The pipe is turned and transferred from lower-stage to upper-stage side. The plate-shaped fins 70 are placed between parts of the coil-like pipe of the upper-side coil portion 322b, respectively, and stacked in a vertical direction with spacing.

This hot-water storage type heating and hot-water supply device of the fifth embodiment has the same effects as those of the hot-water storage type heating and hot-water supply device of the first embodiment, and moreover the heat transfer rate of the upper-side coil portion 322b is improved by the plate-shaped fins 70 provided on the outer circumferential surface of the upper-side coil portion 322b of the hot-water supplying heat exchanger 322. Thus, heat exchange is fulfilled enough in the upper-side high-temperature hot-water region within the hot-water storage tank 21, so that high-temperature supply hot water can be obtained.

Sixth Embodiment

Figure 10:
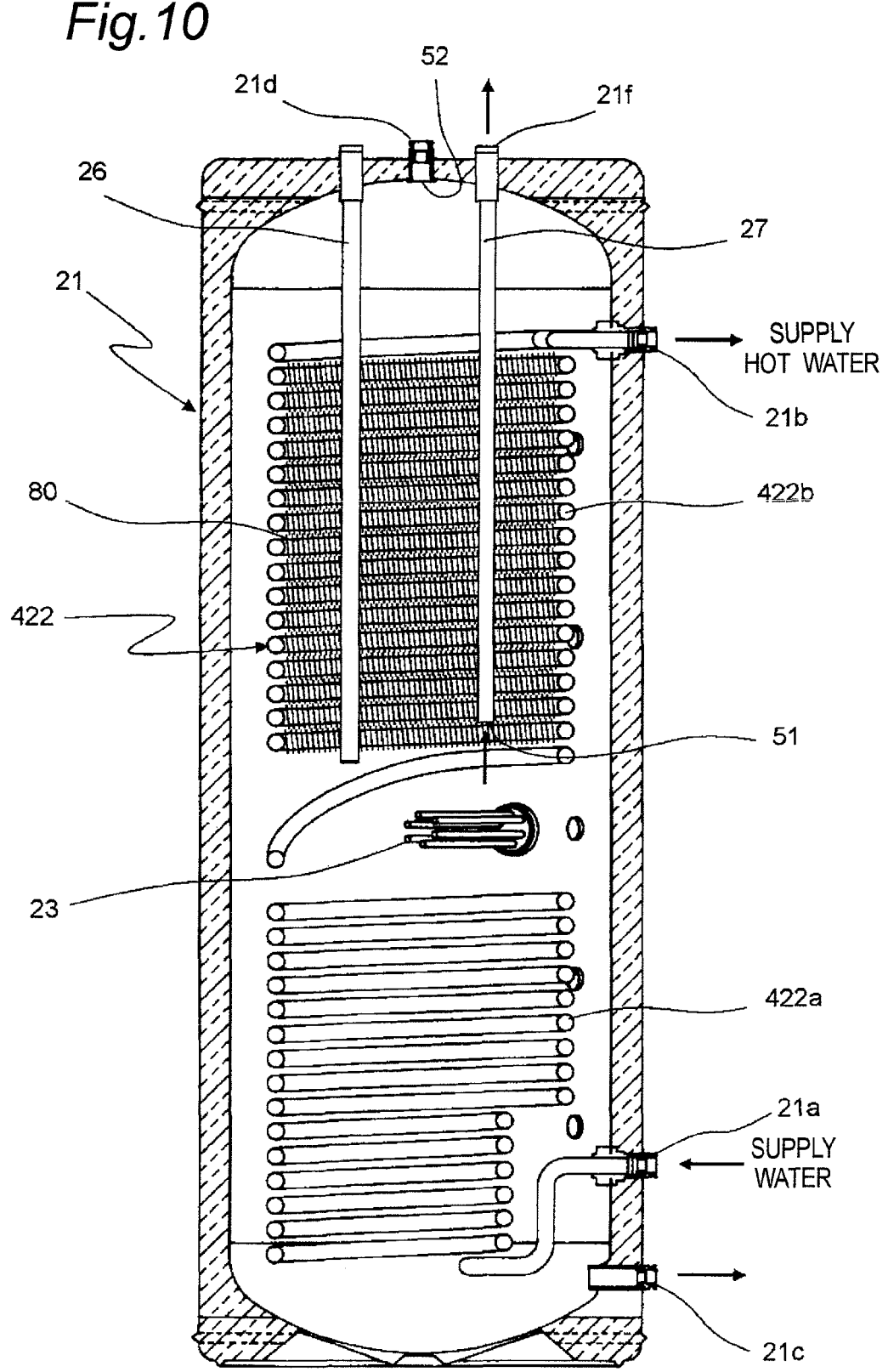
FIG. 10 is a longitudinal sectional view of a hot-water storage tank of a hot-water storage type heating and hot-water supply device with use of the hot-water storage type hot-water supply device according to a sixth embodiment of the invention.

FIG. 10 is a longitudinal sectional view of a hot-water storage tank of a hot-water storage type heating and hot-water supply device with use of a hot-water storage type hot-water supply device according to a sixth embodiment of the invention. This hot-water storage type heating and hot-water supply device of the sixth embodiment is the same in construction as the hot-water storage type heating and hot-water supply device of the first embodiment except the fins of the hot-water supplying heat exchanger, and the same component members are designated by the same reference signs with their description omitted.

In the hot-water storage type heating and hot-water supply device of the sixth embodiment, as shown in FIG. 10, a hot-water supplying heat exchanger 422 formed of a coil-like pipe is placed in the hot-water storage tank 21. This hot-water supplying heat exchanger 422 has a lower-side coil portion 422a and an upper-side coil portion 422b connected to each other with a specified spacing, and spiral-shaped fins 80 are provided on the outer circumferential surface of the upper-side coil portion 422b.

The hot-water storage type heating and hot-water supply device of the sixth embodiment has the same effects as those of the hot-water storage type heating and hot-water supply device of the first embodiment, and moreover the heat transfer rate of the upper-side coil portion 422b is improved by the spiral-shaped fins 80 provided on the outer circumferential surface of the upper-side coil portion 422b of the hot-water supplying heat exchanger 422. Thus, heat exchange is fulfilled enough in the upper-side high-temperature hot-water region within the hot-water storage tank 21, so that high-temperature supply hot water can be obtained.

In addition, the plate-shaped fins 70 are provided in the upper-side coil portion 322b in the fifth embodiment, and the spiral-shaped fins 80 are provided in the upper-side coil portion 422b in the sixth embodiment. However, without being limited to these shapes of the fins, the fins have only to be capable of improving the heat transfer rate of the upper-side coil portion.

The invention claimed is:

1. A hot-water storage hot-water supply device comprising:
    a heat pump unit for heating water;
    a hot-water storage tank for storing hot water heated by the heat pump unit;
    a hot-water supplying heat exchanger including a pipe which is placed in the hot-water storage tank so as to extend substantially entirely in a vertical direction thereof and which receives water from a lower side thereof and discharges hot water from an upper side thereof;
    a hot-water temperature sensor detecting a temperature of water heated by the heat pump unit; and
    a boil-up three-way valve an input side of which is connected to the heat pump unit, one output side of which is connected to a lower portion of the hot-water storage tank to flow water from the input side into the lower portion of the hot-water storage tank so as to be merged into water filled within the hot-water storage tank, and another output side of which is connected to an upper portion of the hot-water storage tank to flow water from the input side into the upper portion of the hot-water storage tank so as to be merged into water filled within the hot-water storage tank,
    wherein the boil-up three-way valve is configured to flow water from the input side to the another output side connected to the upper portion of the hot-water storage tank when the detected temperature of water heated by the heat pump unit is equal to or greater than a predetermined temperature, and to flow water from the input side to the one output side connected to the lower portion of the hot-water storage tank when the detected temperature of water heated by the heat pump unit is less than the predetermined temperature.

2. The hot-water storage hot-water supply device as claimed in claim 1, wherein heat exchange power of the hot-water supplying heat exchanger per unit volume of the hot-water storage tank is so set as to be higher in an upper-side portion than in a lower-side portion.

3. The hot-water storage hot-water supply device as claimed in claim 1, wherein the hot-water supplying heat exchanger includes a coil-shaped pipe.

4. The hot-water storage hot-water supply device as claimed in claim 3, wherein
    the hot-water supplying heat exchanger has a lower-side coil portion and an upper-side coil portion, and
    an electrothermal heater placed between the lower-side coil portion and the upper-side coil portion is included.

5. The hot-water storage hot-water supply device as claimed in claim 3, wherein the coil-shaped pipe of the hot-water supplying heat exchanger has a smaller pitch in an upper-side portion than in a lower-side portion.

6. The hot-water storage hot-water supply device as claimed in claim 3, wherein the coil-shaped pipe of the hot-water supplying heat exchanger is smaller in inner diameter in a lower-side portion thereof than in an upper-side portion thereof.

7. The hot-water storage hot-water supply device as claimed in claim 3, wherein grooves are provided in an inner surface of an upper-side portion of the coil-shaped pipe of the hot-water supplying heat exchanger.

8. The hot-water storage hot-water supply device as claimed in claim 3, wherein fins are provided in an outer circumferential surface of an upper-side portion out of the coil-shaped pipe of the hot-water supplying heat exchanger.

9. The hot-water storage hot-water supply device as claimed in claim 1, wherein the heat pump unit uses carbon dioxide as a refrigerant.

10. A hot-water storage heating and hot-water supply device, comprising:
    the hot-water storage type hot-water supply device as claimed in claim 1;

heating terminals connected between a heating-forward port and a heating-return port of the hot-water storage tank of the hot-water storage type hot-water supply device, and a circulating pump for circulating hot water within the hot-water storage tank via the heating terminals, wherein an upper-side region in the hot-water storage tank is used primarily as a heat source for hot-water supply, and a lower-side region in the hot-water storage tank is used primarily as a heat source for heating.

11. The hot-water storage heating and hot-water supply device as claimed in claim 10, wherein hot water is discharged from an intermediate region in the hot-water storage tank to the heating terminals by the circulating pump.

* * * * *